United States Patent [19]

Kajita et al.

[11] 4,431,285
[45] Feb. 14, 1984

[54] MOVABLE MIRROR ARRANGEMENT FOR USE IN SINGLE LENS REFLEX CAMERA

[75] Inventors: Hideo Kajita; Takeshi Egawa; Yukio Miki, all of Osaka, Japan

[73] Assignee: Minolta Camera Kabushiki Kaisha, Osaka, Japan

[21] Appl. No.: 390,621

[22] Filed: Jun. 21, 1982

[30] Foreign Application Priority Data

Jun. 22, 1981 [JP] Japan .................... 56-92787[U]

[51] Int. Cl.³ .................. G03B 7/099; G03B 19/12
[52] U.S. Cl. .................................. 354/405; 354/152; 354/479
[58] Field of Search .............. 354/22, 23 R, 55, 56, 354/152, 155

[56] References Cited

U.S. PATENT DOCUMENTS 3,468,233 9/1969 Schmidt .................. 354/55
4,293,209 10/1981 Kurei .................... 354/55

Primary Examiner—William B. Perkey
Attorney, Agent, or Firm—Watson, Cole, Grindle & Watson

[57] ABSTRACT

A movable mirror arrangement for use in a single lens reflex camera, including a main mirror and an auxiliary mirror. The arrangement includes a pivotal shaft about which the auxiliary mirror is pivoted towards the main mirror at the time of photographing an object, a main mirror holder having an opening formed larger in size than the auxiliary mirror, and a masking plate for shielding, at the time of photographing the object, a clearance formed adjacent to the pivotal shaft of the auxiliary mirror between the auxiliary mirror and the opening.

11 Claims, 5 Drawing Figures

MOVABLE MIRROR ARRANGEMENT FOR USE IN SINGLE LENS REFLEX CAMERA

BACKGROUND OF THE INVENTION

1. Field of the Invention

The present invention generally relates to a single lens reflex camera a and more particularly to a movable mirror arrangement for use in a single lens reflex camera, the arrangement including a main mirror, at least a part there of constituting of light transmitting portion, and an auxiliary mirror.

2. Description of the Prior Art

A conventional-type movable mirror arrangement is generally constructed as follows. In finder observation state, light transmitted through a photographic lens is divided by the main mirror into a first portion of light which is reflected toward a view finder system and a second portion of light which is transmitted through the main mirror and is led by reflection on and auxiliary mirror to a photoelectric means for exposure control, focus detection, etc. In a photographing state, both the main mirror and the auxiliary mirror are retracted out of the region where light transmitted through the photographic lens passes through the camera toward a film positioned to be exposed.

Conventionally, in a single lens reflex camera provided with a movable mirror arrangement of the above-described type, it has been so arranged that as shown in FIG. 1 when, in a finder observation state, light transmitted through a photographic lens 2 is divided into a first portion and a second portion by a main mirror 4 having a rectangular configuration and suitably inclined as shown. Namely, the first portion, i.e., the light reflected by the main mirror 4, is led to a view finder system comprising a reticle or focusing screen 6, a pentagonal prism 8 and an ocular or eyepiece 10, while the second portion, i.e., the light transmitted through the main mirror 4, is reflected by a rectangular auxiliary mirror 12 disposed behind the main mirror 4 substantially at right angles with respect to the main mirror 4 so as to be led to a photoelectric means 14 for exposure control, focus detection, etc. Furthermore, it is so arranged that, in the photographing state, both of the main mirror 4 and auxiliary mirror 12 are retracted into positions as shown in broken lines in FIG. 1 so as to permit light to proceed from the photographic lens 2 to the film 5 without obstruction by the mirrors and to prevent light entering the camera through the view finder system from proceeding into the light path region between the photographic lens 2 and the photographic film 5.

Namely, when the movable mirror arrangement is moved from the finder observation state to the photographing state, the main mirror 4 is pushed upwardly in the direction indicated by arrow A in FIG. 1 and, at the same time, the auxiliary mirror 12 is pivoted towards the main mirror 4 in the direction indicated by arrow B in FIG. 1 so as to be overlapped on the main mirror 4 in a parallel relation therewith as shown in broken lines in FIG. 1.

A mirror operating mechanism as referred to above is disclosed, for example, in U.S. Pat. No. 4,293,209 wherein the main mirror is caused to swing from the view finder observation position to the photographing retraction position wherein the auxiliary mirror introduces light passed through the main mirror when positioned in the finder observation position to a light-measuring element. In the above described U.S. Patent, the auxiliary mirror is mounted swingably on the main mirror and has a rotary shaft around which the auxiliary mirror can swing. Further, it is so arranged that both ends of the rotary shaft are rotatably mounted on both sides of a frame supporting the main mirror and the end portion of an operating arm of the auxiliary mirror is brought into contact with a cam fixedly secured to a stationary member by means of a spring. More specifically, referring back to FIG. 1, the main mirror 4 has a light-dividing portion in the center thereof for dividing incident light into the two portions as described above through reflection and transmission thereof. More specifically, it is so arranged that, in the photographing state, the light-dividing portion is covered by the auxiliary mirror 12 and an auxiliary mirror holder (not shown) for holding the auxiliary mirror 12 so as to prevent light from proceeding through the view finder system and into the optical path region between the photographic lens 2 and the film 5, because such light is detrimental to photographing.

However, it should be noted here that since, as a matter of fact, a main mirror holder for holding the main mirror 4 and and auxiliary mirror holder for holding the auxiliary mirror 12 are also provided in the above-described arrangement shown in FIG. 1, it may undesirably occur that the auxiliary mirror holder is left in the optical path region described above in the photographing state without being displaced to the position shown in broken lines in FIG. 1 due to such a complicated structure.

In order to eliminate such a phenomenon, it may be so arranged that the main mirror holder is formed with a rectangular opening for accommodating the rectangular auxiliary mirror 12 therein so that a part of the auxiliary mirror 12 may be fitted into the rectangular opening in the photographing state. However, in such an arrangement since the rectangular opening should be formed larger in size than the auxiliary mirror such that the auxiliary mirror may be loosely fitted into the rectangular opening, four clearances are undesirably formed between four side edges of the rectangular opening and corresponding four side edges of the rectangular auxiliary mirror 12. If such clearances are incompletely shielded against light in the photographing state, light incident reversely from the view finder system proceeds through the clearances into the optical path region between the photographic lens to and film, which is detrimental to fine photography.

SUMMARY OF THE INVENTION

Accordingly, an object of the present invention is to provide an improved movable mirror arrangement for use in a single lens reflex camera including a main mirror which is a half mirror or has a light-transmitting portion and an auxiliary mirror, in which the light incident from the view finder system is completely prevented from proceeding, through the main mirror and into the optical path region between the photographic lens and the photographic film.

Another object of the present invention is to provide an improved movable mirror arrangement for use in a single lens reflex camera including a main mirror and an auxiliary mirror, in which a clearance formed adjacent to a pivotal shaft of the auxiliary mirror between the auxiliary mirror and an opening provided in a main mirror holder for holding the main mirror can also be completely shielded against light, with substantial elimination of the disadvantages inherent in conventional movable mirror arrangements of this kind.

Another object of the present invention is to provide an improved movable mirror arrangement of the above-described type which is capable of shielding as described above with a simple structure and without increase in size.

Still another object of the present invention is to provide an improved movable mirror arrangement of the above-described type which is capable of shielding as described above, which is highly reliable in actual use, which is suitable for mass production at low cost, and which can be readily incorporated into single lens reflex cameras and the like at low cost.

In accomplishing these and other objects according to one preferred embodiment of the present invention, there is provided an improved movable mirror arrangement for use in a single lens reflex camera, including a main mirror and an auxiliary mirror, in which the main mirror is supported by a plurality of projections formed on a main mirror holder for holding the main mirror so as to be maintained flat and a masking plate is provided in a space conventionally formed between the main mirror and the main mirror holder such that the light transmitted through the main mirror is completely prevented from entering the optical path region between the photographic lens and the film by means of the masking plate and other shielding means such as an auxiliary mirror, an auxiliary mirror holder or other shielding plate except for the masking plate.

In accordance with the present invention, since the masking plate is disposed within a space conventionally formed between the main mirror and the main mirror holder, an improved movable mirror arrangement for use in the single lens reflex camera which is remarkably simple in structure and compact in size is advantageously presented.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
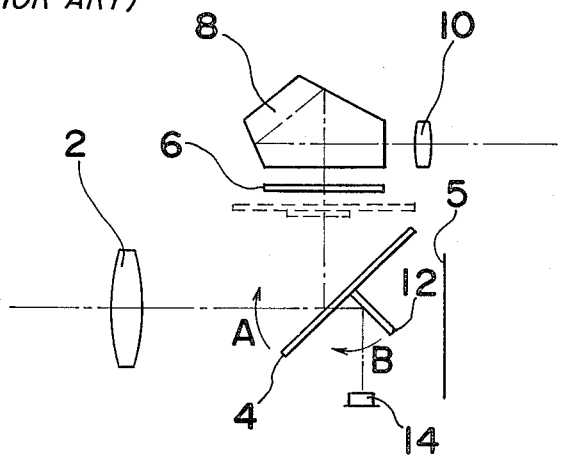
FIG. 1 is a schematic view of a single lens reflex camera to which a movable mirror arrangement according to the present invention may be applied.

Referring now to the drawings, there is shown in FIGS. 2 to 5, a movable mirror arrangement K according to one preferred embodiment of the present invention, including a rectangular plate-like main mirror 16 having a light-dividing portion consisting of a half mirror portion in the center thereof, a main mirror holder 18 of a similar configuration for holding the main mirror 16, a masking plate 20, a rectangular plate-like auxiliary mirror 24 and an auxiliary mirror holder 28 for holding the auxiliary mirror 24.

Figure 5:
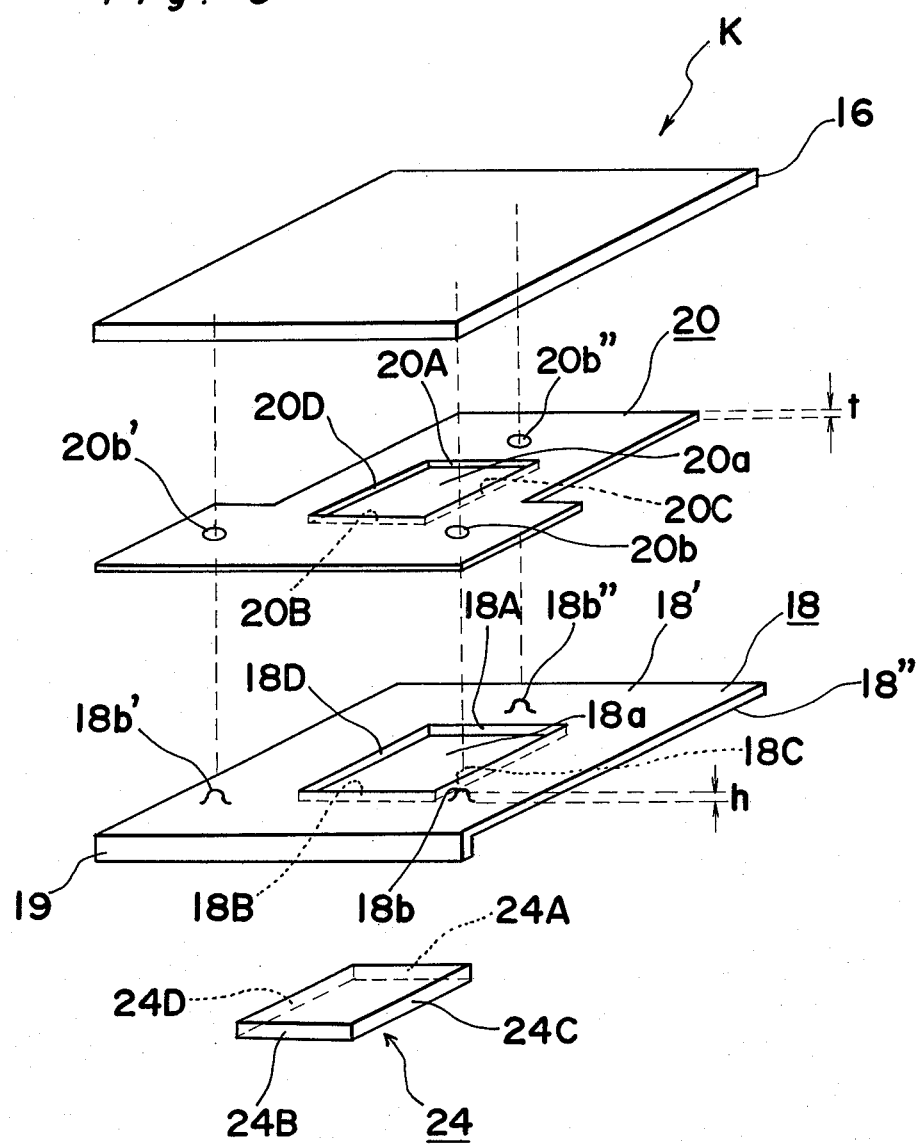
FIG. 5 is a partial exploded view of the movable mirror arrangement of FIG. 3.

As best shown in FIG. 5, the main mirror holder 18 has one surface 18' and the opposite surface 18", and is formed with a bent portion 19 which is provided at one end thereof and extends from the surface 18" at right angles thereto in a direction remote from the surface 18'. The main mirror holder 18 has a rectangular opening 18a formed at a position corresponding to that of the light-dividing portion of the main mirror 16 such that the auxiliary mirror 24 may be loosely fitted into the opening 18a in photographing state shown in FIG. 3. Accordingly, the opening 18a is formed larger in size than the auxiliary mirror 24 and has four side faces 18A, 18B, 18C and 18D so that the side faces 18A and 18C may confront the side faces 18B and 18D, respectively. The main mirror holder 18 is provided with three projections 18b, 18b' and 18b" having a height h. These projections are formed on the surface 18' by punching from the surface 18". The projections 18b and 18b' are formed adjacent to the side face 18B and one end of the main mirror holder 18 at the side of the bent portion 19 while the projection 18b" is formed between the side face 18A and the other end of the main mirror holder 18 remote from the bent portion 19.

The masking plate 20 has a thickness t and is made, for example, of a metal sheet painted by matte black painting or a plastic sheet which is matte black in color. The masking plate 20 has a rectangular light-transmitting opening 20a formed at the position corresponding to that of the-portion of the main mirror 16. The light-transmitting opening 20a has four side faces or side edges 20A, 20B, 20C and 20D such that the side faces 20A and 20C may confront the side faces 20B and 20C, respectively. The masking plate 20 further has three circular holes 20b, 20b' and 20b" provided at positions corresponding to those of the projections 18b, 18b' and 18b" of the main mirror holder 18, respectively. It should be noted here that the light-transmitting opening 20a is formed smaller in size than the opening 18a of the main mirror holder 18 so as to limit the width of the light bundle proceeding through the main mirror 16 to the auxiliary mirror 24 in a finder observation state as shown in FIG. 2.

The auxiliary mirror 24 has four side faces 24A, 24B, 24C and 24D which confront corresponding side faces 18A, 18B, 18C and 18D of the opening 18a of the main mirror holder 18, respectively, when the auxiliary mirror 24 is fitted into the opening 18a in the photographing state.

Figure 2:
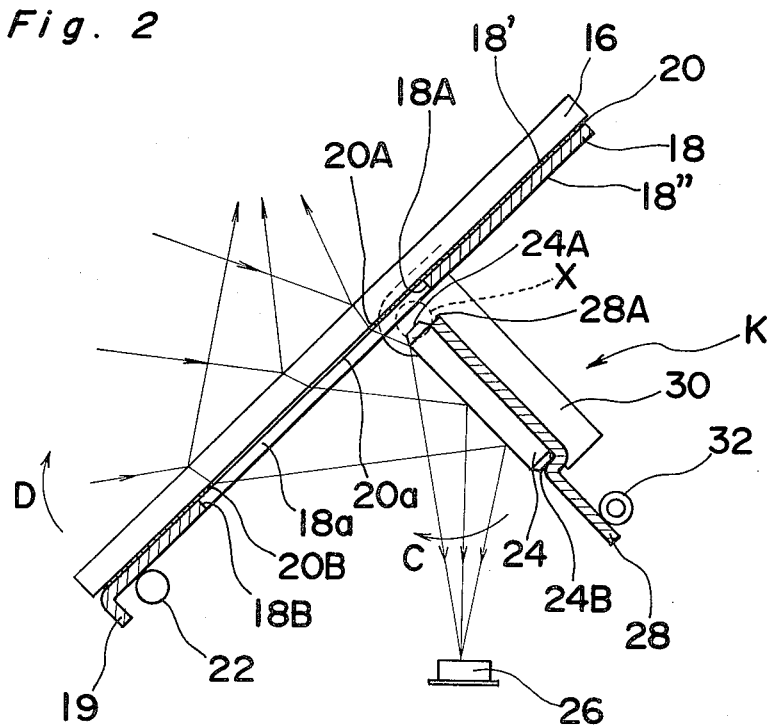
FIG. 2 is a cross-sectional view showing the movable mirror arrangement according to one preferred embodiment of the present invention in finder observation state.

Referring now to FIG. 2, there is shown the movable mirror arrangement K in the finder observation state. It is to be noted that the opening 18a of the main mirror holder 18 is provided not only for allowing light transmitted through both of the main mirror 16 and the opening 20a of the masking plate 20 to proceed to the auxiliary mirror 24 in the finder observation state, but for accommodating the auxiliary mirror 24 therein in the photographing state. Since the main mirror 16 is supported by the projections 18b, 18b' and 18b" of the main mirror holder 18, there is provided a space between the main mirror 16 and the main mirror holder 18, which space is of width equal to the height h of the projections 18b, 18b' and 18b". The masking plate 20 is disposed in the space between the main mirror 16 and the main mirror holder 18, and is secured to the main mirror holder 18. The position of the main mirror 16 is determined through contact of the main mirror holder 18 by an eccentric pin 22. The inclination of the main mirror is adjusted by changing an eccentric amount of the eccentric pin 22. As shown, light transmitted through the main mirror 16 is reflected by the auxiliary mirror 24 so as to be led to a photoelectric means 26 for exposure control, focus detection, etc. The auxiliary mirror 24 is securely held by the auxiliary mirror holder 28 which is formed integrally with an auxiliary mirror holder arm 30. The auxiliary mirror 24, auxiliary mirror holder 28 and auxiliary mirror holder arm 30 are pivotally supported by the main mirror holder 18 so as to be pivoted about a pivotal shaft X of the auxiliary mirror 24. It should be noted that the auxiliary mirror holder 28 is urged relatively to the main mirror holder 18 in a counterclockwise direction in FIG. 2 by a spring (not shown) and pivotal movement of the auxiliary mirror 24 in the counterclockwise direction is limited through contact of the auxiliary mirror holder 28 by an eccentric pin 32. The position of the auxiliary mirror relative to the main mirror is adjusted by means of changing the eccentric amount of the eccentric pin 32. As described earlier, the opening 18a of the main mirror holder 18 is formed to be larger in size than the auxiliary mirror 24 and the pivotal shaft X of the auxiliary mirror 24 is disposed so as to be positioned partially within the opening 18a.

By the above-described arrangement, in the photographing state as shown in FIG. 2, light reflected by the main mirror 16 is led to the optical system of the view finder comprising the reticle or focus screen 6, pentagonal prism 8 and ocular or eyepiece 10 as shown in FIG. 1 so that an image of the object may be observed through the view finder. Meanwhile, light transmitted through the main mirror 16 and the opening 20a of the masking plate 20 passes through the opening 18a of the main mirror holder 18 and then is reflected by the auxiliary mirror 24 so as to be led to the photoelectric means 26, with the width of its light bundle being regulated by the width of the opening 20a of the masking plate 20. The photoelectric means 26 may be used to measure light intensity received thereby for exposure control or to detect focus condition.

Figure 3:
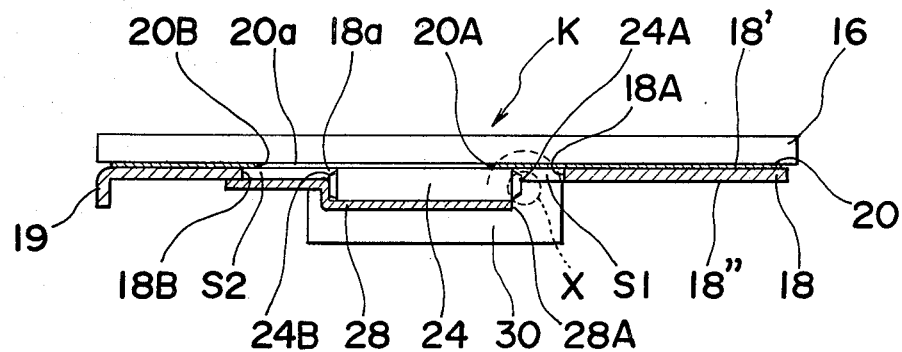
FIG. 3 is a view similar to FIG. 2, showing the movable mirror arrangement of FIG. 2 in photographing state.

During the course of moving from the finder observation state as shown in FIG. 2 to the photographing state, the auxiliary mirror 24 is pivoted towards the main mirror 16 about the pivotal shaft X in the direction indicated by arrow C in FIG. 2 and, at the same time, the main mirror 16 is pushed upwardly together with the auxiliary mirror 24 in the direction indicated by arrow D in FIG. 2 such that the main mirror 16 and auxiliary mirror 24 may be retracted out of an optical path region from the photographic lens 2 to a photographic film, thus resulting in a state shown in FIG. 3.

In the photographing state as shown in FIG. 3, a part of the auxiliary mirror 24 is fitted into the opening 18a of the main mirror holder 18 since the opening 18a is formed to be larger in size than the auxiliary mirror 24 to enable the auxiliary mirror 24 to be loosely fitted therein. Accordingly, clearances S1, S2, S3 (not shown) and S4 (not shown) are formed between side faces 24A, 24B, 24C and 24D of the auxiliary mirror 24 and corresponding side faces 18A, 18B, 18C and 18D of the opening 18a, respectively. It should be noted here that the pivotal shaft X of the auxiliary mirror 24 is disposed adjacent to the clearance S1 formed between the side face 24A and the side face 18A. If, in photographing state, light entering from the view finder is allowed to pass through any one of the clearances S1 to S4 into the optical path region between the photographic lens and the film or into the photoelectric means 26, light measurement by the photoelectric means 26 or a photograph to be taken may be adversely affected. However, in this embodiment of the present invention, such an undesirable phenomenon does not take place because it is so arranged that light proceeding downwardly through the clearance S2 remote from the pivotal shaft X is blocked by the masking plate 20 and auxiliary mirror holder 28 (thus it is seen that the auxiliary mirror holder 28 also acts as a shielding member) and prevented from entering the optical path region described above or the photoelectric means 26, and that light proceeding downwardly through the clearance S1 adjacent to the pivotal shaft X is blocked by the masking plate 20 so as not to enter the optical path region described above or the photoelectric means 26. Furthermore, clearances S3 (not shown) and S4 (not shown) are also shielded from light by the masking plate 20 and auxiliary mirror holder 28. Accordingly, all the clearances S1, S2, S3 and S4 formed between the auxiliary mirror 24 and the opening 18a of the main mirror holder 18 in the photographing state are shielded against light by the masking plate 20 and auxiliary mirror holder 28. Thus entering the camera in reverse fashion, light through the view finder does not proceed through the clearances S1, S2, S3 and S4 and into the optical path region described above.

It is possible to replace the masking plate 20 with a light-shielding cloth sheet whose opposite ends are secured to the side face 18A of the opening 18a of the main mirror holder 18 and one side face 28A of the auxiliary mirror holder 28 adjacent to the pivotal shaft X of the auxiliary mirror 24, respectively. However, in with this construction, the auxiliary mirror 24 is urged in the direction of arrow C in FIG. 2, i.e., in a clockwise direction, by the light-shielding cloth sheet in the finder observation state, so that the auxiliary mirror holder 28 may be brought out of contact with the eccentric pin 32, thus resulting in and inaccurate positioning of the auxiliary mirror 24. Moreover, with this construction a central portion of the light-shielding cloth sheet may undesirably hang downwardly in the photographing state so as to enter into the optical path region described above.

On the other hand, since the auxiliary mirror 24 is not urged at all by the masking plate 20 of the movable mirror arrangement K of the present invention, the auxiliary mirror 24 is accurately positioned by the eccentric pin 32, with the result that the above-described undesirable phenomenon associated with the light-shielding cloth sheet does not take place.

Figure 4:
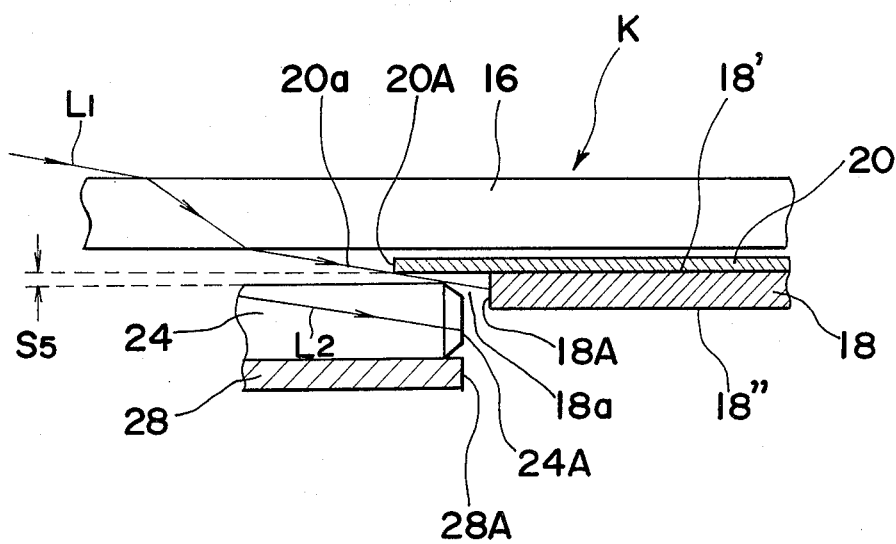
FIG. 4 is a view showing, on an enlarged scale, a main part of the movable mirror arrangement of FIG. 3.

Referring now to FIG. 4, there is shown, on an enlarged scale, a main part of the movable mirror arrangement K of FIG. 3 adjacent to the pivotal shaft X of the auxiliary mirror 24 in the photographing state. As shown, a slight clearance S5 is formed between the masking plate 20 and the auxiliary mirror 24. Although it may be a hazard that a ray of light will pass through the clearance S5 as shown by $L_1$ and the optical path region between the photographic lens and the film and adversely affects the photographing, the ray of light is absorbed by the side face 18A of the opening 18a of the main mirror holder 18 so as not to proceed downwardly further and thus, the photographing is not adversely affected. In order to absorb such rays of light, the side face 18A is painted matte black. Furthermore, the side face 24A of the auxiliary mirror 24 is also painted matte black so that light passing through the auxiliary mirror with a slight inclination to the auxiliary mirror as shown by a light ray $L_2$ in FIG. 4 is prevented from proceeding through the side face 24A of the auxiliary mirror 24 into the optical path region between the photographic lens and the film. Namely, light entering from the view finder system having slight inclination to the auxiliary mirror 24 as shown by light rays $L_1$ and $L_2$ is prevented from proceeding into the optical path region by means of overlapping the side face 24A of the auxiliary mirror 24 with the side face 18A of the opening 18a of the main mirror holer 18.

In conventional movable mirror arrangements it has been also so arranged that a slight clearance is formed between the main mirror and the main mirror holder, but such clearance has not been utilized in the conventional arrangements. Referring now to FIG. 5 related to the present invention for convenience of description of the clearance between the main mirror and the main mirror holder of the conventional movable arrangements, the main mirror holder 18 has three projections 18b, 18b' and 18b" formed on the surface 18'. The main mirror 16 is supported by top portions of the projections 18b, 18b' and 18b" all having an identical height h. Namely, it has been also conventionally so arranged that the main mirror 16 is spaced from the main mirror holder 18 by the height h of the projections 18b, 18b' and 18b", but the clearance having the width h between the main mirror 16 and the main mirror holder 18 has not been utilized in the conventional movable mirror arrangements. It is to be noted that the main mirror 16 is supported by at least three projections formed on the main mirror holder 18 because, if the main mirror 16 is bonded to the main mirror holder 18 through overall surface contact, the main mirror 16 is subjected to torsion due to local difference in drying rate of the bonding agent so as not to be held flat.

On the other hand, in the movable mirror arrangement K of the present invention, although the masking plate 20 is disposed in the clearance between the main mirror 16 and the main mirror holder 18, the movable mirror arrangement K is not made larger in size therefor. Referring to FIG. 5 again, the masking plate 20 has three circular holes 20b, 20b' and 20b" formed at positions corresponding to those of the projections 18b, 18b' and 18b" of the main mirror holder 18, respectively. The position of the masking plate 20 relative to the main mirror holder 18 is determined by means of the engagement of the projections 18b, 18b' and 18b" with the circular holes 20b, 20b' and 20b", respectively. The top portions of the projections 18b, 18b' and 18b" support the main mirror holder 18. Since the masking plate 20 is positioned with respect to the main mirror holder 18, the light-transmitting opening 20a of the masking plate 20 is disposed at a position accurately corresponding to that of the opening 18a of the main mirror holder 18. Furthermore, since the thickness t of the masking plate 20 is smaller than the height h of the projections 18b, 18b' and 18b" of the main mirror holder 18, top portions of the projections 18b, 18b' and 18b" out of the circular holes 20b, 20b' and 20b", respectively, when the masking plate 20 has been secured to the main mirror holder 18. Then, the main mirror 16 is supported to the top portions of the projections 18b, 18b' and 18b" projecting out of the circular holes 20b, 20b' and 20b", respectively. Thus, the main mirror 16 is secured to the main mirror holder 18, such that the space having the height h is formed between the main mirror 16 and the main mirror holder 18. Since the masking plate 20 is disposed in the space, provision of the masking plate 20 does not result in and increase in size of the movable mirror arrangement K, as compared with conventional movable mirror arrangements.

As is clear from the foregoing description, in the movable mirror arrangement K of the preferred embodiment of the present invention, it is so arranged that, when the auxiliary mirror 24 has been partially fitted into the opening 18a of the main mirror holder 18 in the photographing state, the clearances S1, S2, S3 and S4 formed between the auxiliary mirror 24 and the opening 18a of the main mirror holder 18 are shielded against light; namely, the clearance S1 adjacent to the pivotal shaft X of the auxiliary mirror 24 is shielded against light by the masking plate 20, the clearance S2 opposite to the clearance S1 is shielded against light by the auxiliary mirror holder 28 and masking plate 20 as shown in FIG. 3, and the clearances S3 (not shown) and S4 (not shown) which are formed at right angles with the clearances S1 and S2 are also shielded against light by the auxiliary mirror holder 28 and masking plate 20. Accordingly, in the movable mirror arrangement K, such an undesirable phenomenon does not take place that light which has entered reversely from the view finder proceeds into the optical path region between the photographic lens and the film and adversely affect the photograph to be taken. Furthermore, since the masking plate 20 is disposed in the space which has been conventionally formed between the main mirror 16 and the main mirror holder 18 so that main mirror 16 is supported with maintaining flatness thereof, an additional space is not required for shielding the clearances S1, S2, S3 and S4 from light. Since the auxiliary mirror 24 is partially fitted into the opening 18a of the main mirror holder 18 in the photographing state, the movable mirror arrangement K is made compact in size. Moreover, since the masking plate 20 is only employed additionally in the movable mirror arrangement K as compared with conventional movable mirror arrangements, the movable mirror arrangement K is kept simply in structure.

Furthermore, in the movable mirror arrangement K of the preferred embodiment of the present invention, since the clearance S1 formed adjacent to the complicated pivotal mechanism of the auxiliary mirror 24 is completely shielded against light by the masking plate 20, a space used for the complicated pivotal mechanism can be increased by means of extending the opening 18a of the main mirror holder 18 for increasing the clearance S1. It is to be noted here that, in the movable mirror arrangement K of the present invention, part of the pivotal shaft X is located within the opening 18a.

Moreover, since the masking plate 20 is also effective for limiting width of light bundle incident upon the photoelectric means 26 in the finder observation state, other means for limiting the width of the light bundle is not required, and therefore, the movable mirror arrangement K is made simple in structure.

According to the preferred embodiment of the present invention, since the auxiliary mirror 24 is effective only for shielding the opening 18a by means of entering of the auxiliary mirror 24 into the opening 18a in the photographing state, the light reflected on the auxiliary mirror is not utilized in such a state. Therefore, it can be so arranged that a shielding plate for shielding the opening 18a by entering into the opening 18a, instead of the auxiliary mirror 24, is pivotably mounted on the main mirror holder, and that the auxiliary mirror is supported by other auxiliary mirror holder which is not mounted on the main mirror holder 18 so as to be movable between a first position for leading light transmitted through the main mirror to the photoelectric means 26 in the finder observation state and a second position out of the optical path region from the photographic lens to the film in the photographing state. In such modified arrangement, light incident from the view finder system with having slight inclination to the shielding plate, as shown by light rays L1 and L2 in FIG. 4, is prevented from proceeding into the optical path region described above by means of overlapping of a part of the shielding plate entering into the opening of the main mirror holder with the side face of the opening of the main mirror holder.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. In a single lens reflex camera comprising a photographic lens, a view finder optical system, photoelectric means, and a movable mirror arrangement having a main mirror, at least a part thereof constituting a light-transmitting portion, and an auxiliary mirror interconnected pivotably with said main mirror, said movable mirror arrangement being so arranged that, when in a finder observation state, light transmitted through said photographic lens is divided into a first portion led to said view finder optical system and a second portion led to said photoelectric means, and that, when in a photographing state, said auxiliary mirror is overlapped with said main mirror on a position out of an optical path region between said photographic lens and a photographic film located to be exposed, the improvement of said movable mirror arrangement comprising:
a main mirror holder formed with an opening, which is secured to said main mirror so as to hold said main mirror; and
a masking plate which is disposed in a space formed between said main mirror and said main mirror holder;
whereby said masking plate is capable of shielding, when in the photographing state, a clearance formed adjacent to a pivotal axis of said auxiliary mirror between said auxiliary mirror and said opening so as to prevent incident light which has entered reversely through said view finder optical system from passing through said clearance into said optical path region.

2. A movable mirror arrangement as claimed in claim 1, wherein said opening of said main mirror holder is larger is size than said auxiliary mirror so that at least a part of said auxiliary mirror may be fitted into said opening in the photographing state.

3. A movable mirror arrangement as claimed in claim 2, wherein said masking plate is formed with a light-transmitting opening which is smaller in size than said opening of said main mirror holder.

4. A movable mirror arrangement as claimed in claim 2, wherein said masking plate is constructed so as to limit a width of the light bundle incident upon said photoelectric means when in the finder observation state.

5. A movable mirror arrangement as claimed in claim 4, wherein said main mirror holder is provided with at least three projections for supporting said main mirror, with the width of said masking plate being smaller than the height of said at least three projections.

6. A movable mirror arrangement as claimed in claim 5, wherein said masking plate has through-holes formed at positions corresponding to those of said at least three projections of said main mirror holder, and the position of said masking plate relative to said main mirror holder is determined by means of engagement of said through-holes by said at least three projections.

7. In a movable mirror arrangement for use in a single lens reflex camera which includes a photographic lens, a view finder system and photoelectric means for receiving light transmitted through said photographic lens, said movable mirror arrangement including a main mirror, which is a half mirror or has a light-transmitting portion, and an auxiliary mirror, and being so arranged that, when in a finder observation state, light transmitted through said photographic lens is divided by said main mirror into a first portion led to said view finder system and a second portion led to said photoelectric means through the reflection on said auxiliary mirror, whereas when in photographing state, both of said mirrors are retracted out of an optical path region between said photographic lens and a photographic film, the improvement of said movable mirror arrangement comprising:
a main mirror holder for supporting said main mirror formed with an opening through which light transmitted through said main mirror passes; and
a masking plate disposed between said main mirror and said main mirror holder, and being formed with a light-transmitting portion on a position corresponding to a position of said opening of said mirror holder, said light-transmitting portion of said masking plate being shaped to be smaller in size than said opening of said main mirror holder,
whereby, when in a photographing state, said masking plate shields the periphery of said opening of said main mirror holder.

8. A movable mirror arrangement as claimed in claim 7, further comprising a shielding member pivotably mounted on said main mirror holder, whereby said opening of said main mirror holder is shielded by said masking plate and by means of overlapping of said shielding member with said main mirror holder when in a photographing state.

9. A movable mirror arrangement as claimed in claim 8, wherein said main mirror holder is provided with at least three projections of substantially identical height, and the thickness of said masking plate is smaller than the heights of said projections.

10. A movable mirror arrangement as claimed in claim 9, wherein said masking plate has through-holes formed on positions corresponding to those of said at least three projections of said main mirror holder, and the position of said masking plate relative to said main mirror holder is determined by means of engagement of said through-holes by said projections.

11. A movable mirror arrangement as claimed in claim 8, wherein said auxiliary mirror is supported by said shielding member, and said shielding member and said auxiliary mirror are incorporated with each other for shielding said opening.

* * * * *